July 12, 1966  J. R. SEITZ  3,260,526
SIMULATED GOLF GAME
Filed July 16, 1963  2 Sheets-Sheet 1
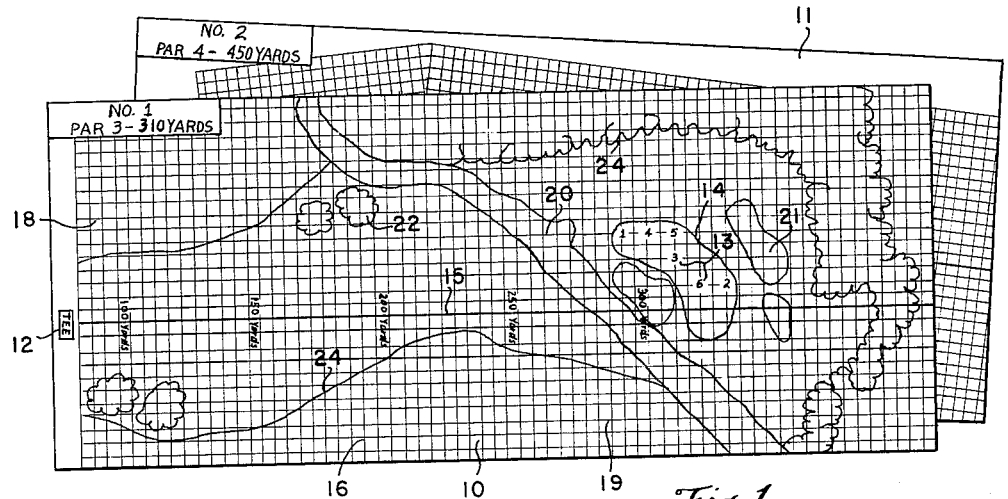
Fig. 1
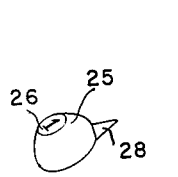
Fig. 2
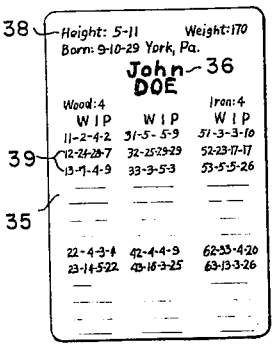
Fig. 3
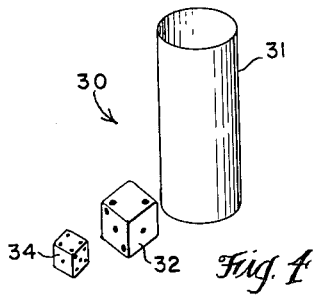
Fig. 4
Fig. 5
INVENTOR.
JOHN R. SEITZ
BY
Joseph A. C. Brown
ATTORNEY July 12, 1966  J. R. SEITZ  3,260,526
SIMULATED GOLF GAME
Filed July 16, 1963  2 Sheets-Sheet 2

INVENTOR.
JOHN R. SEITZ
BY
*Joseph A. Brown*
ATTORNEY

United States Patent Office

3,260,526
Patented July 12, 1966

3,260,526
SIMULATED GOLF GAME
John R. Seitz, 915 Wheaton Drive, Lancaster, Pa.
Filed July 16, 1963, Ser. No. 295,486
1 Claim. (Cl. 273—134)

This invention relates generally to game apparatus and more particularly to a golf game.

Heretofore, golf games have been provided to simulate an actual game of golf. However, such games have usually involved pure chance in securing results and required only a minor exercise of knowledge and judgment. Also, prior golf games have usually involved non-variable, repetitious procedures, whereby players became bored and interest was quickly lost.

A main object of this invention is to provide a game whereby one to four players can closely simulate an actual golf game.

Another object of this invention is to provide a golf game having a gameboard over which a gamepiece is movable, the success of a particular "shot" being related to the location of the gamepiece on the board.

Another object of this invention is to provide a golf game wherein proper club selection is required for each shot to obtain a good score.

Another object of this invention is to provide a golf game having plural gameboards each of which depicts a particular golf hole different from other golf holes whereby the players are confronted with a variety of problems as the game is played.

A further object of this invention is to provide a golf game in which a gamepiece is adapted to be moved from tee to green along a playing area, and to the left and right of a center line, such area bearing indicia denoting various hazards such as rough, water and sand traps and the results of plays being related to the location of the ball relative to these hazards.

A still further object of this invention is to provide a golf game of the character described by which a player is able to learn, through experience, proper club selection and playing strategy.

Other objects of this invention will be apparent hereinafter from the specification and from the recital in the appended claims.

In the drawings:

FIG. 1 is a plan view showing on top a gameboard of the golf game on which is depicted a particular golf hole and beneath such gameboard there is a second board on which is depicted a different golf hole;

FIG. 2 is a perspective view showing a gamepiece of the type used in the game and movable over the gameboards;

FIG. 3 shows a play card of the type used in playing the golf game;

FIG. 4 shows the chance number selector means employed; and

FIGS. 5, 6 and 7 show various charts from which play results are secured.

In my Patent No. 3,043,594, there is disclosed a football game wherein play cards are related to actual players and bear indicia producing play results commensurate with the ability of the players in real life. In this respect, the present golf game invention follows my football game. The play cards, subsequently described, relate to professional golfers and their particular ability with woods, irons, wedge and putter. A given golfer may be an excellent iron player, but only fair as a putter, or he might be an above average putter but only average with wood shots. All of these factors are important in producing the number indicia which are placed on a particular card; and the cards and charts are inter-related to give desired play results.

However, aside from the similarity to the football game mentioned above, there are certain problems which are unique to the playing of golf. For example, club selection is very important. Even a good golfer will not land on a green if he selects the wrong club for a particular shot. This factor is incorporated into the present game; a game player will score better if he utilizes proper club selection. Conversely he will do poorly if he fails to select the proper club for a particular shot. In this sense, the game is instructional as well as entertaining. A player of the game will soon appreciate the importance of club selection in playing golf and he may apply this knowledge to an actual game of golf.

With this general background in mind, the golf game will now be described:

In the game, a gameboard is provided for each golf hole. Thus, there are eighteen gameboards in a set, each gameboard being different from the others and providing various golfing situations as is found in real life. In FIG. 1, a gameboard 10 for hole No. 1 is shown on top of another gameboard 11 for hole No. 2. Each gameboard bears indicia denoting the situation of a particular hole. Hole No. 1 will be described, it being understood that the other gameboards are similarly arranged but with different yardages, hazard problems and the like.

On gameboard 10 there is a tee 12 and green 14, spaced from each other and suitably illustrated on the board as indicated. The green bears six numbers 13 from one to six denoting hole locations as subsequently described. Extending longitudinally of the gameboard from tee 12 to green 14 is a medial line 15. In hole No. 1, line 15 is straight. However, on another hole line 15 might have sections angularly related to each other when there are "dog leg" fairways and indicating the direction in which the golfer plays to reach the green.

Extending transversely to medial line 15 are lines 16 which are equally spaced apart and designate various yardage distances from the tee. For hole No. 1 on gameboard 10, the green 14 is 310 yards away. To the left of medial line 15 are spaced parallel lines 18 and to the right of line 15 are spaced parallel lines 19. These lines denote yards left L and right R, respectively, of the medial line to take into consideration shots which are either hooked or sliced. Various hazards are depicted on gameboard 10, including a waterway 20, sand traps 21, trees 22 and rough 24.

Movable on gameboard 10, or another board for a different hole, is a gamepiece 25, bearing a number at 26 to denote the particular game player, either one, two, three or four. Four gamepieces are provided and each gamepiece 25 has a pointer 28 at one end whereby the gamepiece may be properly positioned and located on the gameboard.

To produce a two digit number, used in developing play results, chance number selector means 30 is provided comprising a cup 31, one large die 32 and one small die 34. When the dice are dumped onto a playing surface from cup 31, the large die provides the first digit of the number and the second die, the second number.

Each player of the game uses a play card 35 of the type shown in FIG. 3, and representing a professional golfer in real life whose name appears at 36, along with other information at 38. Each game set is provided with a plurality of play cards and the game players can pick their favorite golfer, or if desired, select a card at random. Each card 35 bears three columns headed W, I, and P, to designate wood, iron and putter shots respectively. Alongside the columns are two digit numbers indicated at 39.

Figures 6, 7:
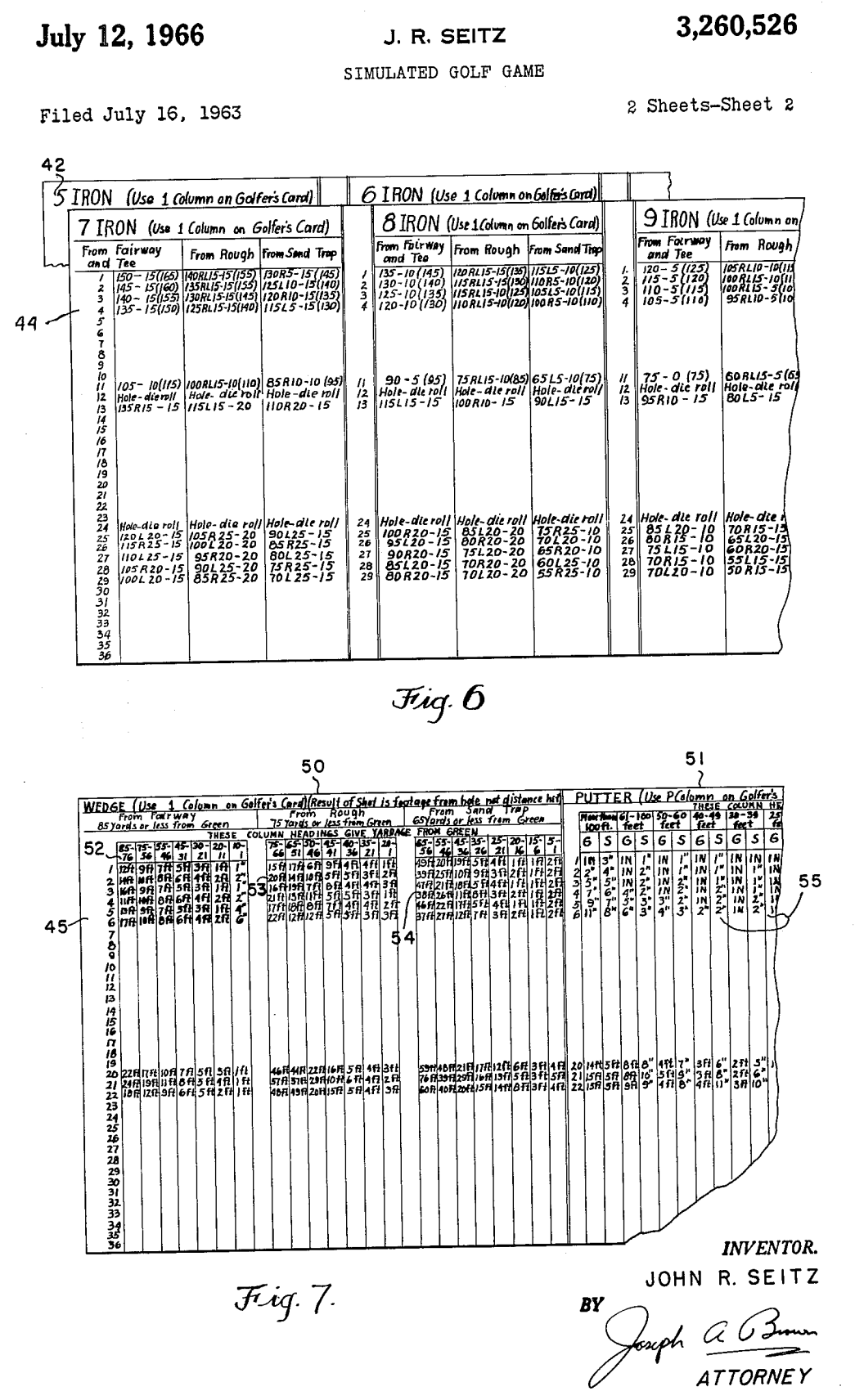

To secure the results of plays, charts are employed as shown in FIGS. 5, 6 and 7. When the club used is a wood, chart 40 is employed; chart 41, shown fragmentarily, is used for low irons 2, 3 and 4; chart 42, shown fragmentarily in FIG. 6, is used for 5 and 6 iron shots; chart 44 relates to 7, 8 and 9 irons and chart 45 to wedge and trap shots, and putting.

Referring to chart 40, each shot result is given in yards on the fly, plus roll. For example, in the "Driver Column," No. 3, the drive is 230 yards, plus 60 yards of roll. This is a straight shot. At No. 17 under the same column, there is a designation 185L20–45. This denotes 185 yards out from the tee 12, left 20 yards and then forward roll of 45 yards. Opposite No. 18 is 185R15–40, indicating straight 185, right 15 yards, then forward roll of 40 yards.

For the 2 wood shots, there is a column 46 for a shot originating from the fairway or tee 12 and columns 48 and 49 for shots from the rough 24 and traps 21, respectively. The other charts for other clubs have columns similarly designated, as shown, for tee, rough and trap shots. See 5-Wood Section of FIG. 5 and chart sections for iron shots in FIG. 6.

The chart 45, FIG. 7, is used to secure play results for wedge shots and putting. Section 50 contains the wedge information and section 51 putting results. Section 50 has three subsections 52, 53 and 54 for shots originating from the fairway, rough and trap, respectively, and less than 85, 75 and 65 yards from the green, respectively. Unlike the other charts, the result given for a particular shot is the distance the ball stopped from the hole, not the distance travelled.

Once on the green, the putter section 51 of chart 45 is employed. Various columns 55 are denoted indicating various distances from the hole. The longer the putt, the more difficult it is to make. Also, related to each column 55 are two subcolumns headed G and S, G indicating a situation where the putter is gambling in an attempt to sink his putt with one shot and S when he is playing it safe.

To play the game, each player selects a play card 35, representing a particular golf pro, and a gamepiece 25. One to four players can play the game at one time. Starting at tee 12 of hole No. 1 on gameboard 10, the players get ready to tee off. Hole No. 1 is 310 yards long; each player must start by stating the particular club he will use for the tee shot. Because of the waterway 20, a particular player might select a driver, a 2–Wood or possibly even a 3-Wood, depending upon the driving ability of the pro represented by the play card. The player orally states his club selection. Then he rolls the dice 32–34 and obtains a two digit number such as 13. The large die 32 produces the first digit; the small die 34 the second. Referring to his play card numbers in column 39 and under column W or Wood, the number 7 is shown opposite 13. Then chart 40 is used. If a "driver" was the club called for, the item 7 is checked in the driver section of the chart indicating a drive of 250 yards. No right or left yardage is indicated. Then the player moves his particular gamepiece 25 along medial line 15 and toward the green 14, placing the point 28 of the gamepiece at the proper yardage mark, or sixty yards short of the green.

If the player rolled a 43 with the dice, the W column of the play card opposite 43 gives the number 16, which in the driver column shows a shot 195 yards along bold medial line 15, right 20 yards and then forward 45 yards, placing the ball in the rough 24.

If the player had selected a 2-Wood and rolled a 13 with the dice, this would also produce a number 7 under the W column. Upon referring to the "Brassie" section of chart 40, a drive of 220 yards is indicated. If a 3-Wood had been employed, the drive would have been 190 yards. It will also be noted that these yardages result from fairway and tee shots. The use of a 2 or 3 Wood from the rough 24 or a trap 21 would result in referring to a different chart column, producing a different result.

After each player "tees off," the particular location of the hole on green 14 is determined. A roll of one die produces a number from 1 to 6. The number obtained is the hole location. Thereupon, the players shoot for the green.

If a given player is 185 yards away from the green, he might select a 4 iron, for example, for his second shot. At 140 yards he might select a 7 iron, or at 100 yards a 9 iron. When within 85 yards of the green and on the fairway, or 75 yards from the rough, or 65 yards from a trap, the Wedge is used.

For long iron shots with irons 2–4, the W column of each play card is employed. For irons 5–9 and the Wedge, the Iron or I column is used.

In measuring second shots, and other shots before reaching the green where the player is not on medial line 15 at the time of shooting, the yardage distance is measured back to the center medial line, in a direction perpendicular to it, and then along the center line to the green. The player must take this into consideration when selecting his club.

The particular chart used in securing a second shot or subsequent shot play result depends upon the club used and the location of the ball at the time of the shot. As previously indicated, different yardages are obtained from fairway, rough and trap locations, and each club has three columns for these locations in each chart section.

Unlike the distance figures for the other clubs, the distance given on the Wedge Section 50 of the chart is the distance the ball stopped from the hole, not the distance travelled. Also, this distance is in feet, not yards.

After the players shoot for the green and all have landed thereon, they determine their respective distances from the selected hole. The yardage from the hole is multiplied by three and then divided by two to determine the distance. Then each player putts, using the P column on each play card to produce play results after rolling the dice. The results using chart 51 are either "IN" or a specified distance in feet from the hole. The column 55 used depends upon the distance of the putt. The players keep putting until each ball is "IN."

As the various gameboards are played on, representing different holes and situations, the players must use judgment and proper club selection. Favorable game winning results will only be obtained when a player uses the correct club for a particular shot. Every hole presents a new and different challenge which will hold player interest through the entire eighteen holes.

In the drawings, only a portion of the indicia actually used on play card 35 is shown in FIG. 3. Further, the charts in FIGS. 5–7 show only a limited amount of indicia, illustrative of the indicia used throughout.

In the actual game, there are other details of the game not described here. But while this invention has been described in connection with a particular embodiment thereof, it will be understood that it is capable of modification, and this application is intended to cover any variations, uses or adaptations following, in general, the principles of the invention and including such departures from the present disclosure as come within known or customary practice in the art to which the invention pertains, and as fall within the scope of the invention or the limits of the appended claim.

Having thus described my invention, what I claim is:

A golf game comprising a plurality of different gameboards on each of which a particular golf hole is depicted including a tee, a green spaced therefrom and a fairway extending between the tee and green, a medial line extending from said tee to said green, a first series of lines spaced from each other and extendinng across said medial line to denote distance marks between said tee and green, a second series of lines both right and left of said medial line and parallel thereto dividing said first series of lines into sections to denote distance marks right and left of the medial line, indicia on each gameboard denoting rough, traps and water hazards in locations related to said tee, green and medial line, a gamepiece positionable and movable on said gameboard, a play card having three separate sets of number indicia thereon representing wood, iron and putter shots respectively, a plurality of playing charts divided into sections having indicia giving separate play results for wood, iron and putter shots, respectively chance number selector means by which a two digit number is produced, a plurality of numbers on said play card opposite and related to said three sets of number indicia, a plurality of numbers on said playing charts opposite and related to the indicia in each section, the result of a particular shot being determined by a number produced by said selector means, then referred to the same number on said play card and the indicia related to a selected wood, iron or putter, the play card then providing a number for reference to the playing chart section also related to the wood, iron or putter selected, and whether the position of the gamepiece at the start of a play on a particular gameboard is on said fairway or in said rough or traps, and said charts giving a play result in yards of flight plus roll for the movemnet of said gamepiece on a gameboard from said tee, toward said green, along said medial line, across said series of lines, and right and left of the medial line as directed by said chart.

References Cited by the Examiner

UNITED STATES PATENTS

| | | | |
|---|---|---|---|
| 1,541,202 | 6/1925 | Winbigler | 273—134 |
| 1,728,630 | 9/1929 | Sanderson | 273—134 |
| 2,157,172 | 5/1939 | Hays | 273—134 |
| 3,043,594 | 7/1962 | Seitz | 273—146 X |

FOREIGN PATENTS 737,062   9/1955   Great Britain.

DELBERT B. LOWE, *Primary Examiner.*

E. R. ZACK, *Assistant Examiner.*